350-3.74 SR

XR 3,716,301

SEARCH ROOM

United States Patent [19]

Caulfield et al. SUBSTITUTE FOR MISSING XR

[11] 3,716,301

[45] Feb. 13, 1973

[54] FINGERPRINT IDENTIFICATION APPARATUS

[75] Inventors: Henry John Caulfield, Carlisle; Dean Roger Perkins, Sudbury, both of Mass.

[73] Assignee: Sperry Rand Corporation, New York, N.Y.

[22] Filed: March 17, 1971

[21] Appl. No.: 125,148

[52] U.S. Cl. ....................356/165, 356/71, 356/162, 356/168

[51] Int. Cl. ....................G01b 9/08

[58] Field of Search ....................356/71, 162 SF, 168

[56] References Cited

UNITED STATES PATENTS

| | | | |
|---|---|---|---|
| 3,200,701 | 8/1965 | White | 356/71 |
| 3,357,299 | 12/1967 | Noble | 350/162 SF |
| 3,511,571 | 5/1970 | Ogle | 350/162 SF |
| 3,565,565 | 2/1971 | Reid | 350/71 |

OTHER PUBLICATIONS

Horvath, V. V. et al., "Holographic Technique Recognizes Fingerprints," Laser Focus, June 1967, pp. 18–23.

*Primary Examiner*—Ronald L. Wibert
*Assistant Examiner*—Paul K. Godwin
*Attorney*—S. C. Yeaton

[57] ABSTRACT

A coherent optical processor fingerprint identification apparatus in which identification is established by correlating an optical beam pattern representative of the finger to be identified with a prerecorded Fourier transform spatial filter of the fingerprint. Reliability of identification is improved by incorporating a mask in the processor so that the detector receives information primarily indicative of the correlation between certain features of the fingerprint and the spatial filter to the exclusion of other less significant features. Further improvement is achieved by means of dual detector affirmation-negation type signal processing techniques and, in the particular case of holographic filters various multiplexing techniques are also utilized for signal enhancement.

7 Claims, 12 Drawing Figures

INVENTORS
HENRY JOHN CAULFIELD
DEAN ROGER PERKINS
BY
H P Terry
ATTORNEY

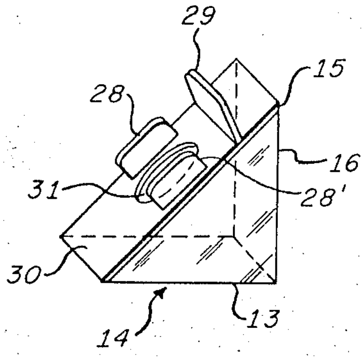
FIG. 4.
FIG. 5b.
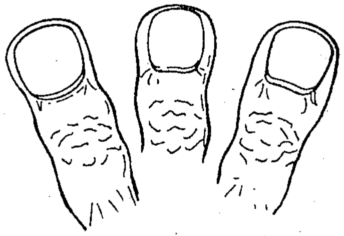
FIG. 5a. FIG. 5c.
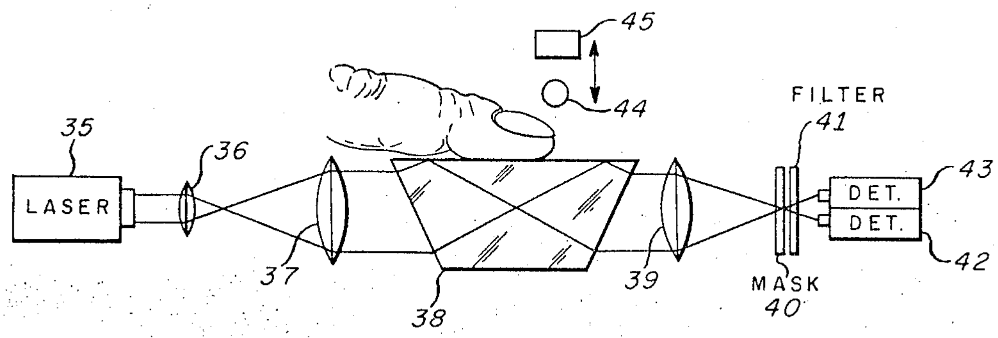
FIG. 6.
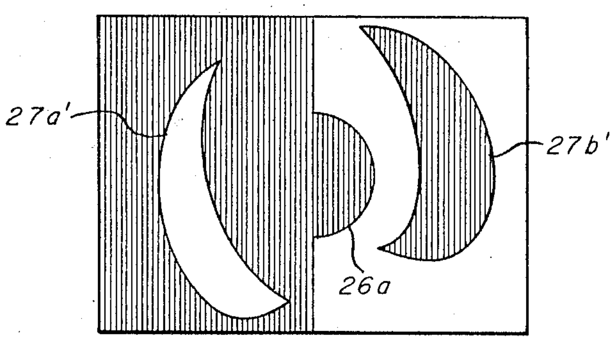
FIG. 7.
INVENTORS
HENRY JOHN CAULFIELD
DEAN ROGER PERKINS
BY
H P Terry
ATTORNEY INVENTORS
HENRY JOHN CAULFIELD
DEAN ROGER PERKINS
BY
H P Terry
ATTORNEY

FINGERPRINT IDENTIFICATION APPARATUS

BACKGROUND OF THE INVENTION

1. Field of the Invention

This invention relates to fingerprint identification and more particularly to improvements in coherent optical correlating methods and apparatus for comparing input fingerprint data with a prerecorded spatial filter representative of the fingerprint. The input fingerprint data may be presented as an optical beam derived directly from a finger or a transparency or other suitable fingerprint recording. The prerecorded spatial filter may constitute part of a card which is carried by the person to be identified or, alternatively, may be kept at a fixed location in a storage bank containing a multiplicity of other prerecorded spatial filters. Moreover, the improvements herein described can be utilized in both holographic and non-holographic devices and are applicable to a variety of purposes relating, for example, to credit card identification, area security and law enforcement systems. Further, it should be understood that the invention is not necessarily restricted to recognition of fingerprints but can be used as well for recognizing any skin surface characterized by a unique configuration of ridges and valleys forming a three-dimensional pattern, and the use of the word fingerprint herein is to be construed to include these variations.

2. Description of the Prior Art

Innovations made in the past several years relating to the fingerprint identification art have substantially improved on the classical technique of visually comparing ink recordings of fingerprints. In particular, the adaptation of optical techniques has afforded considerable improvement in terms of eliminating or at least remarkably reducing the time-consuming and tedious manual classification, searching and identification procedures involved in the classical visual comparison method.

Most recently, considerable interest has developed in optical correlation techniques wherein a light beam containing fingerprint data by virtue of transmission through a fingerprint transparency or reflection from a fingerprint recording, or perhaps the finger itself, is correlated with a prerecording of a known print. The prerecording is typically in the form of a photograph or preferably a Fourier transform spatial filter for use in either conventional or holographic type coherent optical processors to obtain insensitivity to the translational position of the finger or transparency in the input plane of the processor. While these correlating devices have afforded significant advantages to the extent of eliminating the need for visual comparison and substantially reducing the time involved in identification, nevertheless the accuracy or reliability of these systems still leaves something to be desired. Accordingly, it is a principal object of the present invention to provide improvements in both holographic and non-holographic coherent optical correlator fingerprint identifying devices for enhancing accuracy and thereby reducing the likelihood of false identification.

SUMMARY OF THE INVENTION

A preferred optical correlator apparatus embodying the principles of the present invention comprises a laser or other suitable light source for directing a coherent optical beam onto a prism utilized as an input mechanism. Upon entering the prism, the light is directed to a surface thereof from which it is normally totally internally reflected and thence through a lens to be focused on a previously recorded spatial filter representative of the finger which is to be identified. The spatial filter is typically characterized by a central information region surrounded by one or more information bands, more or less concentrically disposed about the central region. The concentrically disposed information has been found usually not to be uniformly distributed nor for that matter necessarily to form a continuous band but rather is more likely to be concentrated in two or more extended arcuate segments generally diametrically located about the center region. In any event, for simplicity of description and ease of understanding, these information bands will be referred to as such hereinafter in both the detailed description and the appended claims.

In operation of the apparatus, identification of an individual fingerprint is accomplished by the individual placing a prescribed finger on the surface of the prism at which the total internal reflection normally occurs. In the presence of a finger in contact with the total internal reflection surface, light reflection is frustrated at the discrete locations of the fingerprint ridges while at the locations of the fingerprint valleys reflection occurs as in the absence of a finger. As a consequence of this action, the light beam emitted from the prism is uniquely encoded with the fingerprint information. Thus, if the spatial filter positioned in the path of this data carrying beam is the one which corresponds to the finger held in contact with the prism, the spatial patterns of the beam and filter will match and correlation therebetween will be established. Under this condition, the light transmitted to a detector positioned behind the filter will receive a maximum (or minimum, depending on the nature of the filter) intensity signal and thereby indicate identification.

In accordance with the present invention, it has been found that a significant reduction in the likelihood of erroneous identification is obtained in both holographic and non-holographic processors if provision is made by some means, such as judicious placement of the detector or the use of an appropriately placed mask, so that only the information contained in the concentrically disposed bands is used for identification purposes. It is believed that the enhanced accuracy achieved by this technique accrues from the nature of the information distribution in the central region and concentric bands of the spatial filter. More specifically, it appears that the central region is predominantly representative of factors such as skin surface area in contact with the input prism while the concentric bands contain information relating primarily to the fingerprint pattern and other factors such as skin surface texture, pores, ridge details and scars. Since the surface area of the finger utilized for identification is essentially the same for most individuals and further since the central region represents the greater percentage of the total data, the unique band data which is primarily representative of each individual is suppressed when the detector is permitted to receive all the light transmitted through the spatial filter. This undesirable effect is overcome with the present invention by arranging for the correlator detector to receive only that light which is indicative of the correspondence of data contained in the information bands of the filter and the input optical beam pattern.

Another significant feature of the invention applicable to both holographic and non-holographic spatial filters involves the use of a split screen (half positive-half negative) spatial filter which facilitates the application of dual detection affirmation-negation techniques in establishing identification. Additional features of the invention relate to the manner of processing the detector output signals for enhancing signal strength, and to multiplexing techniques applicable to holographic systems for further improving signal strength and accuracy of identification.

BRIEF DESCRIPTION OF THE DRAWINGS

FIG. 4 is a perspective view of the prism input member used in the system of FIG. 1.

FIGS. 5*a*, 5*b* and 5*c* depict relative finger orientations for constructing a multiplexed holographic rotational insensitive filter for use in the apparatus of FIG. 1.

FIG. 6 is a schematic illustration of a non-holographic optical system embodiment of the invention.

FIG. 7 is an illustration of a half positive-half negative spatial filter which is useful for affirmation-negation type signal processing in the apparatus of FIGS. 1 and 5.

DESCRIPTION OF THE PREFERRED EMBODIMENTS

Figures 1, 1A:
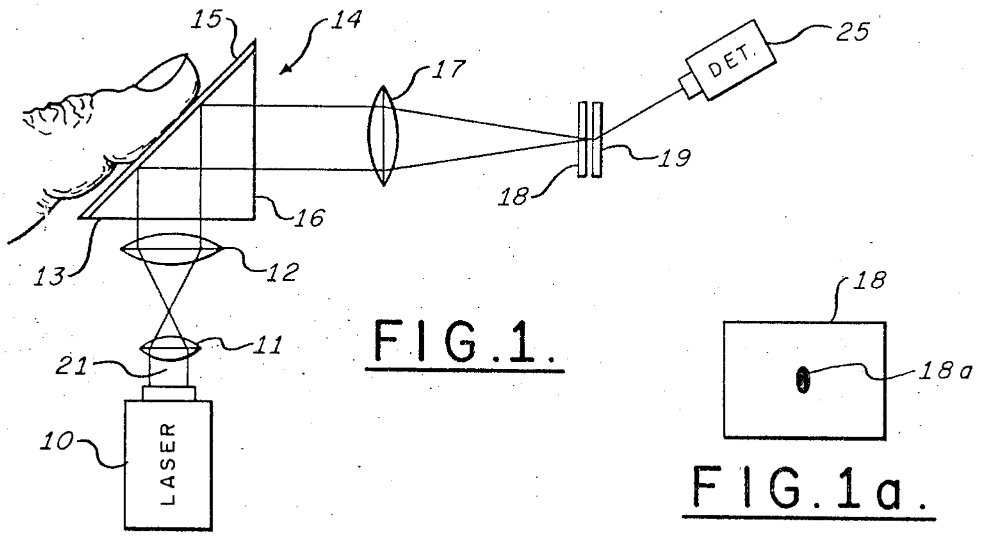
FIG. 1 is a schematic illustration of a holographic optical system embodiment of the invention.
FIG. 1*a* is a front view of the mask included in the apparatus of FIG. 1.

Referring to FIG. 1, a holographic fingerprint recognition system of the present invention comprises a laser 10 directing a light beam through beam expander lens 11 to collimating lens 12 and thence through surface 13 of input prism 14. At surface 15 of the prism the light is normally totally internally reflected for transmission through surface 16 after which it is collected by lens 17 and then focused through mask 18 onto spatial filter 19 located in the rear focal plane of lens 17. As is well understood by those skilled in the art, the filter may be slightly removed from the focal plane, either forward or rearward, without adversely affecting the operation of the device. In fact, such an arrangement might be advantageous in some cases for increasing position tolerances with regard to the spatial filter and the finger to be identified. When a finger is positioned against the data input surface 15 of the prism as indicated in the drawing, all of the light entering the prism is not reflected at the input surface, but instead some light is transmitted into the skin of the finger; that is, a condition of frustrated total internal reflection developes as a consequence of the presence of the finger in contact with the prism surface. More specifically, reflection of light from surface 15 occurs in the localized regions of the valleys of the skin pattern and is frustrated in the regions of the skin ridges so that the light directed toward lens 17 is an optical pattern of the fingerprint wherein the valleys and ridges are represented by bright and dark lines respectively.

Figure 2:
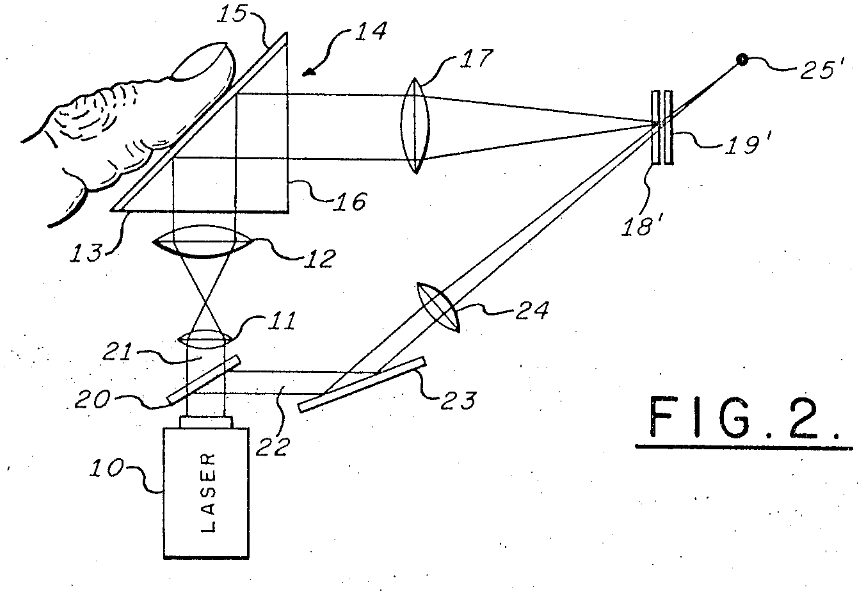
FIG. 2 is a schematic illustration of an optical system for producing a holographic spatial filter intended for use in the embodiment of FIG. 1.

Before proceeding with a more detailed discussion of the operation of the apparatus of FIG. 1, consider momentarily the method of constructing the spatial filter and the detailed characteristics thereof. Apparatus for constructing the spatial filter is shown in FIG. 2, wherein the components identical with the apparatus of FIG. 1 have the same numeral designation. In this instance, the light beam from laser 10 is divided by beam splitter 20 into respective signal and reference beams 21 and 22, respectively. Reference beam 22 is reflected from mirror 23 onto lens 24 from which it is directed onto photographic plate 19' as a slightly converging beam so that it focuses behind the plate at point 25'. The signal beam 21, in the meantime, propagates through lenses 11 and 12, prism 14 and lens 17 so as normally to be focused to a point at photographic plate 19' in the absence of a finger at the input surface of prism 14. In the presence of a finger at the input surface, however, the light directed to lens 17 becomes a data carrying beam uniquely representative of the pattern on the finger held in contact with the prism. This data carrying beam is collected by lens 17 and converged toward photographic plate 19' in superposed relation with reference beam 22. The reference and data carrying signal beams interact to produce an interference pattern in the photographic plate which upon being developed becomes a Fourier transform hologram constituting a complex spatial filter containing both amplitude and phase information relating to the input finger.

Figure 3:
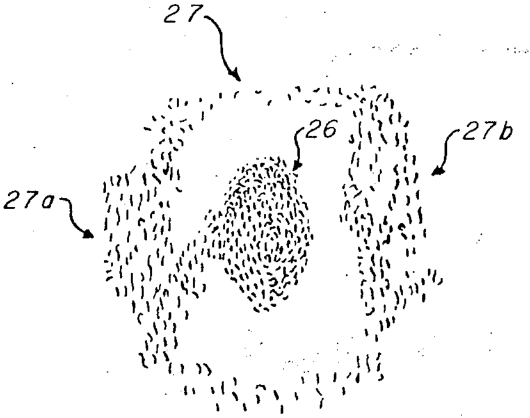
FIG. 3 is a negative transparency of a Fourier transform spatial filter of a fingerprint recorded with the apparatus of FIG. 2.

A Fourier transform hologram of a fingerprint obtained with the apparatus of FIG. 2 is shown in FIG. 3 indicating the regions where light from both the reference beam and the signal beam, reflected from the prism surface areas adjacent the valley regions of the skin, impinged on the photographic plate in a constructively interfering manner. As previously explained, the transform has a central region 26 and a concentrically disposed band 27 in which information is concentrated mostly in segments $27_a$ and $27_b$. The gross shape of band 27 is determined by the directions of the loops, arches and whorls of individual fingerprints. The fine structure of the band is determined by details of the ridges, pores, skin structure and other features of the fingerprint pattern. Other bands (not shown) of larger radius and less brightness are also usually observed about the central region of the transform. The information content of these additional bands can be utilized in the same manner as will be described subsequently with reference to band 27; but, in general, it has been found that satisfactory results can be achieved with the use of only the illustrated band.

In accordance with the present invention, the information in the central region is discarded and only the bands of the filter and corresponding portions of the input optical beam are correlated to avoid suppression of the more important individually distinct information contained in segments $27_a$ and $27_b$. This can be accomplished in various ways. For example, the central region may be masked with an opaque member either during construction of the spatial filter with the apparatus of FIG. 2 or when using it for identification purposes in the apparatus of FIG. 1. Mask 18', which has a central opaque spot corresponding to the central region of the spatial filter, can be used to perform this function in the apparatus of FIG. 2. In this instance only the peripheral sections of the reference and data carrying beams will reach photographic plate 19'. Alternatively, in the case of identification utilizing the apparatus of FIG. 1, detector 25 may be positioned behind the spatial filter so as to receive only the light transmitted through the band of the spatial filter and in particular through segments $27_a$ and $27_b$. In fact, it has been found that satisfactory results can be obtained merely by arranging the detector to receive light transmitted through either one of segments $27_a$ and $27_b$.

The perspective view of the input prism 14 shown in FIG. 4 clearly illustrates the features of an alignment mechanism which is preferably incorporated in the apparatus of FIGS. 1 and 2. The alignment mechanism comprises indexing tabs 28 and 29, which protrude from surface 15, and an opaque member 30 which covers surface 15 except in the region of transparent aperture 31. Opaque member 30 is actually much thinner than illustrated so that the finger is easily able to make firm contact with the input surface of the prism. The indexing tabs function to control the translational location of the finger in contact with the prism along a pair of orthogonal axes oriented normal to the major surfaces of tabs 28 and 29, respectively, while simultaneously providing rotational control as well. The transparent aperture on the input surface of the prism is preferably used in conjunction with the indexing tabs since enhanced performance usually results when the portion of the finger between the fingertip and the joint adjacent thereto is repetitively, accurately registered for both recording and identification. In this respect it should be noted that the input surface of the prism may be enlarged in any convenient manner to accommodate two or more fingers or even an entire hand as a further aid to positional control, particularly for the purpose of minimizing rotation about the longitudinal axis of the finger. In the case of Fourier transform spatial filtering, which is used in the present invention, translational control is not critical as long as the effective aperture of the detector is larger than the spatial patterns that are being correlated. Rotational control, on the other hand, is of primary interest and must be provided by some means such as the indicated indexing tabs. Other means, however, may also be used to achieve the desired rotational control. For example, a rotatable dove prism may be inserted in the path of the data carrying beam in the apparatus of FIG. 1 to achieve opto-mechanical rotational alignment of the finger input optical pattern with the prerecorded spatial filter. Alternatively, a plurality of slightly angularly displaced Fourier transform recordings, multiplexed on a single photographic plate, can be used to compensate for a lack of rotational alignment. In this case, there is no need for either indexing tabs or a rotatable dove prism.

Multiplexed spatial filters can be constructed in the following manner using the apparatus of FIG. 2. First, a Fourier transform hologram is recorded on the photographic plate 19' with the finger in an upright position as indicated in FIG. 5*b* when placed on the input surface of the prism. This orientation of the finger corresponds to the aligned position using the indexing tabs shown in FIG. 4. Then a second Fourier transform hologram is recorded on the photographic plate with the finger rotated slightly to the left as shown in FIG. 5*a*, say 3° or so from the upright position of FIG. 5*b*. Finally, a third Fourier transform hologram is recorded on the photographic plate with the finger rotated slightly to the right, as shown in FIG. 5*c*, again displaced approximately 3° from the upright position. Each of the recordings can be made with the same angular orientation of the reference beam relative to the photographic plate in which case the input fingerprint data will correlate strongly with one of the multiplexed recordings and less strongly with the others in the identification apparatus to provide a resultant signal indicative of the sum of all the correlations. Preferably, each multiplexed hologram should be made with a different reference beam angle relative to the signal beam so that the strongly correlating signal corresponding to a particular orientation of the input finger can be individually detected when performing identification. It will be appreciated that more than three holograms can be multiplexed if desired and the angular displacement between successive hologram recordings adjusted accordingly; but three recordings with the above indicated deviations are believed to be adequate for most applications. Now, with a spatial filter constructed in this manner positioned in the apparatus of FIG. 1, correlation between the input data carrying beam and one of the recordings in the holographic filter will be established irrespective of any slight rotational misalignment of the finger held on the prism. The angular displacement between the successive recordings during the process of making the filter can be regulated, for instance, by a jig rotatable about the center of transparent aperture 31 and having indexing tabs of the type shown in FIG. 4 affixed thereto.

Returning now to a description of the operation of the apparatus of FIG. 1, from the foregoing remarks it should now be apparent that identification of a finger held in contact with the input surface of the prism is established by correspondence between the optical Fourier transform of the finger and the prerecorded Fourier transform filter constructed with the apparatus of FIG. 2. Maximum light intensity will be transmitted to detector 25 when the input finger pattern and the prerecorded patterns match one another. FIG. 1*a* presents a front view of the mask 18 positioned in front of the spatial filter. The opaque spot 18*a* at the center of the mask is arranged to be spatially coincident with the central information region 26 of the filter so that light in the data carrying beam converging thereon from lens 17 does not reach the filter. As previously explained, other techniques can also be used for blocking from the detector that light which would normally be transmitted through the central region of the filter in the absence of the mask, for instance the central region of the filter itself may be made opaque as by inking or other coloring. It should also be noted that it is immaterial on which side of the filter the mask is positioned as long as the central information light is blocked from the detector. The action of the holographic filter in responding to the data carrying signal beam causes reconstruction of the reference beam which converges on detector 25. Thus, for the case where the correlation or reconstructed reference beam is detected without the inclusion of means for blocking the central region, the detector should be positioned closely in back of hologram 19' in order to receive only the band diffracted light before it converges with the central region light. Correspondence of the spatial patterns of the data carrying beam and the filter produces a reconstructed reference beam of strong intensity. Likewise, if the data carrying beam and the filter do not correspond, the light intensity of the reconstructed beam reduces according to the degree of mismatch. It will therefore be appreciated that identification can be determined by a simple threshold detection technique where a detector output signal above a predetermined level indicates correspondence of the finger and spatial filter while a detector output signal below the predetermined level signifies dissimilarity of the finger and filter. The intensity of the light reaching the detector is, of course, diminished by the presence of the mask, but this is compensated for merely by adjusting the threshold level.

In a somewhat more sophisticated dual detection system, accuracy can be further enhanced by the provision of a filter having two spatially multiplexed holograms angularly displaced from one another by 90°, a so-called 0°–90° filter wherein one recording is made using the apparatus of FIG. 2 with the finger in an upright position and another recording is then made on the same photographic plate with the finger rotated 90° from the upright position. Each recording is made with the reference beam directed onto the photographic plate at a different angle so that upon reconstruction of the reference beams during the identification procedure, each reference beam is propagated onto an individually distinct detector. With a filter of this type, a finger corresponding to the upright recording of the filter and positioned on the prism in an upright position in the apparatus of FIG. 1 will correlate with the upright recording to produce a reconstructed reference beam of maximum intensity directed to one of the detectors while the 90° oriented recording produces a reconstructed reference beam of substantially lower intensity directed to the other detector. It should also be noted that the use of multiple recordings in a respective upright position and additional positions angularly displaced to the left and right of the upright position can also be applied to this 0°–90° filter for the purpose of rotational invariance. In other words, three (or more) recordings at slightly displaced angles can be made at the 0° orientation and then three (or more) similarly displaced recordings made at the 90° orientation. Again, each of the recordings at the 0° orientation, that is at 0° and ± 3°, are made with a first angle of incidence of the reference beam on the photographic plate while the recordings at the 90° orientation, that is at 90° and 90° ± 3° are made with a second angle of incidence of the reference beam on the photographic plate.

Another dual detector technique involves the implementation of affirmation-negation type signal processing using appropriately constructed "positive" and "negative" transparencies. In a system incorporating affirmation-negation filters, one detector is positioned to receive the light transmitted through the "-positive" Fourier transform filter (the affirmation signal) and another positioned to receive the light transmitted through the "negative" Fourier transform filter (the negation signal). This will be described more fully in the following paragraphs relating to the non-holographic embodiment of FIG. 6. Another variation of the holographic filters involves the multiplexing or recording of fingerprints of two or more individuals on a single photographic plate, each recording being made with the same angle of incidence between the signal and reference beams. Thus, in the case of an identification card, for example, each individual authorized to use the card could have his fingerprint recorded on the filter thereby enabling the identification apparatus to respond to any one of the appropriate fingers applied to the input member. The multiple rotation, 0°–90° orientation and affirmation-negation techniques are of course equally as applicable to these plural recording systems as to the previously described individual recording systems.

In all of the aforedescribed dual detection systems, double threshold and ratio or difference detection techniques can be applied to the detector output signals for the purpose of enhancing identification reliability as will be discussed hereinafter with reference to FIGS. **8*a* and 8*b***.

Referring to FIG. 6, a non-holographic embodiment of the invention typically comprises a laser 35 or other suitable coherent source directing a light beam through beam expander and collimating lenses 36 and 37 into one side surface of dove prism 38. Upon entering the prism the light is refracted to the top surface from which it is normally totally internally reflected for transmission out the right side surface to be collected by lens 39 and focused through mask 40 onto filter 41. The dove prism performs the same function as the right angle prism 14 shown in FIG. 1 with regard to the result which obtains when a finger is held in contact with the top surface. A dove prism, however, has been found to produce some degree of distortion in the Fourier transform filter so that the Fourier transforms do not look exactly like the one shown in FIG. 3 but instead are somewhat blurred, which has the advantage of increasing positional tolerances in the same manner as previously explained for displacing the spatial filter from the Fourier transform plane. The amount of blurring is related to the degree of collimation of the light beam entering the prism and increases in accordance with increasing convergence or divergence of the beam. The dove prism has the further advantage of facilitating horizontal construction which allows for the more natural vertical finger pressure on the prism. In this respect, it should be noted that prism inputs are not essential for operation of the inventive embodiments but are described herein only because of their simplicity and real time operational capability. In any case, a spatial filter is made with the apparatus of FIG. 6 simply by placing a photographic film in the rear focal plane of lens 39 to record the optical beam pattern (the data carrying beam) produced in the presence of a finger on the input surface of the prism. After the film is developed, it constitutes a Fourier transform spatial filter in the same manner as the previously described holographic filter, except that the filter made with the apparatus of FIG. 6 is devoid of the phase information which is preserved in the holographic filter and therefore may not be quite as discriminatory as the latter. The filter may be constructed with or without the presence of mask 40 which has a central opaque region similar to mask 18 used in the FIG. 1 apparatus for blanking out the central information region of the filter. Detectors 42 and 43 are not necessarily required during the construction of the filter and accordingly could be eliminated at that time. In use of the filter for identification of fingerprints, it is placed in the apparatus of FIG. 6 at the same position it occupied during the recording process with the center blocking mask also present if one was not used for recording and conversely if one was used. In other words, as in the case of the FIG. 1 apparatus, the mask is needed to block the central region information during identification if it was not blocked during construction of the filter or is not ignored in the detection process. In any event, if a mask is used during identification it can be placed on either side of the filter intermediate lens 39 and detectors 42 and 43 also as in the apparatus of FIG. 1.

The previously mentioned dual detector affirmation-negation type signal processing is particularly suited to the non-holographic identification apparatus. A preferred split screen affirmation-negation filter is shown in FIG. 7 where the left and right halves represent respective positive and negative transparencies. The positive transparency is constructed utilizing the apparatus of FIG. 6 in the aforedescribed manner and will operate in the identification apparatus to pass a maximum signal for the correct input finger. The negative transparency half of the filter is then obtained by making an inverted replica of the positive transparency so that the composite split screen filter is made up of complementary pairs of the respective positive and negative transparencies. The negative transparency operates to pass a minimum signal for the correct input finger. It will be appreciated that individual positive and negative transparencies could be used in combination with some means, such as a beam splitter, for directing the data carrying beam to each transparency, but the split screen construction is particularly well adapted to the Fourier transform plane affirmation-negation processing used in the present invention. The center opaque region $26_a$ represents the blanked out portion of the filter and the regions $27_a'$ and $27_b'$ actually include fine structure in the manner of FIG. 3. In the dual detector identification apparatus the detectors are normally placed immediately behind the filter on the side thereof remote from lens 39. Thus, with the spatial filter oriented so that the positive transparency occupies the top half, detector 42 receives the light transmitted therethrough, that is the affirmation signal, while detector 43 receives the light transmitted through the lower half negative transparency, that is the negation signal. If larger Fourier transform patterns are desired than can be conveniently produced by means of a single lens as shown in FIG. 6, a microscope objective or other focal length lens can be positioned in the rear focal plane of lens 39. An arrangement of this sort provides a magnified Fourier transform pattern in all planes behind the microscope objective, and the greater the separation between the microscope objective and the plane at which the filter is located, the greater the magnification. An identical set up is used, of course, for both constructing the filter and employing it for identification purposes. This magnification technique is applicable as well to the embodiment of FIG. 1.

The roller 44 and oil cup 45 shown in FIG. 6 are used for periodically applying a thin oil film to the input surface of the prism and are also applicable to the embodiment of FIG. 1. It has been found that in the case of certain individuals the skin surface is exceptionally dry and tends to degrade system performance. A thin oil film applied to the skin or prism surface compensates for this condition. In the present invention, the oil film is preferably applied to the prism rather than the finger to avoid annoyance to the user and is applied so sparsely as to be undetectible. Application of the oil to the prism is accomplished intermittently when discerned to be necessary by an operator of the equipment who simply moves the roller first into contact with the oil cup and thereafter brings it into contact with and rolls its across the prism input surface. The indexing and aperture arrangements explained with reference to FIG. 1 may also be included in the input device of FIG. 6 if considered desirable or necessary. In addition, independent means, such as rotatable lens or another dove prism, may be included for dealing with rotational misalignment of the input signal relative to the prerecorded filter.

Figure 8A:
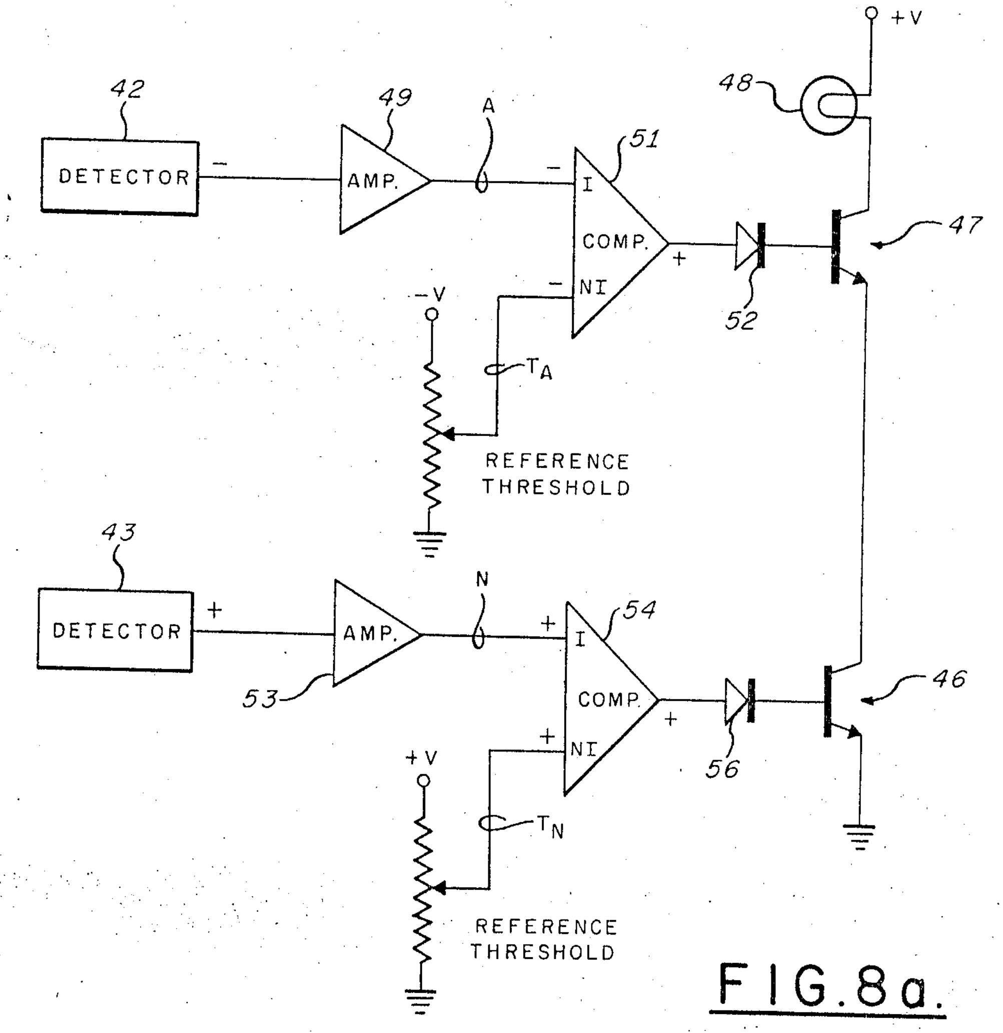
FIGS. 8*a* and 8*b* are simplified schematics of electrical circuits for processing the detector output signals of the apparatus of FIGS. 1 and 7 in accordance with double threshold and ratio or difference detection techniques, respectively.
Figure 8B:
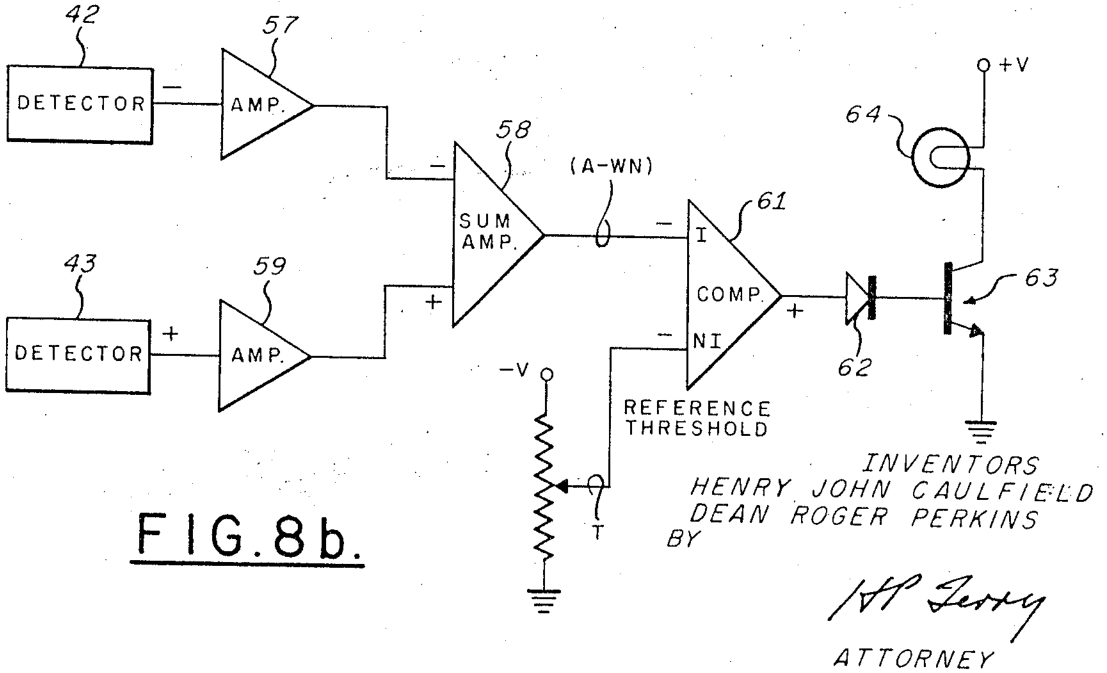

Various ways of processing the dual detector affirmation-negation signals will now be described with reference to FIGS. 8*a* and 8*b*. FIG. 8*a* illustrates a simplified double threshold detection circuit in which photodetectors 42 and 43 provide the affirmation and negation signals respectively. For the purpose of explanation, assume that the affirmation signal provided at the output of photodetector 42 has a negative polarity while the negation signal provided at the output of detector 43 is of positive polarity. The criterion for identification with the double threshold detection circuit is that the affirmation signal, designated A, must be greater than a predetermined threshold $T_A$. Likewise, the negation signal, designated N, must be less than another predetermined threshold $T_N$. Identification will then be established for $A > T_A$ and $N < T_N$. This is accomplished with the circuit of FIG. 8a as follows. Transistor 46 is normally conducting while transistor 47 is normally non-conducting in the absence of a finger applied to the input prism of the previously described identification devices, and therefore the indicator lamp 48 is de-energized. In the presence of an applied finger corresponding to the spatial filter inserted in the identification device, detector 42 provides a negative output signal which is magnified in non-inverting amplifier 49 to produce a large negative signal A at the inverting input terminal of comparator 51. When this negative input exceeds the negative reference potential $T_A$ applied to the non-inverting input terminal of the comparator, a resultant positive voltage is provided at the comparator output to produce current flow through diode 52 into the base of transistor 47. Simultaneously, the positive polarity negation signal at the output of detector 43 is magnified in non-inverting amplifier 53 to produce a positive signal N at the inverting input terminal of comparator 54. If this positive voltage is less than the positive reference voltage $T_N$ applied to the inverting input terminal of comparator 54, a positive signal is produced at the comparator output causing current to flow through diode 56 to hold transistor 46 in a saturated conduction state. Thus, for $A > T_A$ and $N < T_N$ both transistors conduct and lamp 48 is energized, signifying identification. For either $A < T_A$ or $N > T_N$, or both, one of the transistors will be driven to a non-conducting state and the lamp will not be energized. It should be noted that normalization will probably be required to assure satisfactory operation of the double threshold detection apparatus. For instance, assume that one individual X when correlating his finger with a prerecorded spatial filter of his finger produces an affirmation signal of 100 and a negation signal of 10 while another individual Y correlating his finger with his corresponding filter produces an affirmation signal of 150 and a negation signal of 5. If the affirmation threshold $T_A$ is set at 120, individual X would not satisfy the affirmation requirement. On the other hand, if the affirmation threshold was set at 90 to assure identification of X, it is quite probable that some individual other than Y might be able to satisfy the affirmation requirement for a signal greater than 90 when correlating with Y's filter, in view of Y's high affirmation level of 150. Similar problems can develop with regard to the negative threshold. These difficulties can be overcome by including normalization means to assure that all individuals correlating with their respective filters produce the same affirmation and negation signal levels. In the illustrative example, for instance, Y's affirmation signal would be reduced to 100 while X's negation signal would be reduced to 5. This could be accomplished simply by superimposing appropriate neutral density filters with the spatial filters during construction of the identification cards.

The signal processing or decision circuit, rather than operating on the basis of a double threshold, may alternatively be constructed to operate on the basis of the ratio of the affirmation to negation signals or the difference therebetween. For the ratio technique, the criterion to be satisfied is that the ratio of the affirmation signal A to the negation signal N must be greater than a predetermined threshold T, that is $(A/N) > T$, which is mathematically equivalent to $A - TN > O$, the criterion for the difference technique. The latter can be modified to introduce a fixed scaler or weighting function so that the condition to be satisfied is $A - WN > T$ where W represents the weight assigned to the negation signal. A simple difference circuit is shown in FIG. 8*b* where again for descriptive purposes the affirmation detector 42 is assumed to provide a negative output signal and the negation detector 43 a positive output signal. The affirmation signal is applied through non-inverting amplifier 57 to one input terminal of summing amplifier 58 where it is summed with the negation signal applied through non-inverting amplifier 59 to the other input of the summing amplifier, which in turn provides an output signal equal to the difference between the affirmation and negation signals. The weight W desired to be assigned to the negation signal is provided for simply by adjusting the gain of amplifier 59 relative to that of amplifier 57. For the case of an affirmation signal greater than the negation signal and assuming non-inverting operation of the summing amplifier, a negative polarity signal will be produced at the summing amplifier output. This negative signal is applied to the inverting input terminal of comparator 61 for comparison with the negative reference voltage T applied to the non-inverting input of the comparator. Thus, when the summing amplifier output signal $(A - WN)$ is greater than the predetermined threshold T, a positive signal is produced at the comparator output to direct current through diode 62 into the base of transistor 63 causing the transistor to conduct and illuminate lamp 64 to signify identification. For the condition where the threshold signal exceeds the summing amplifier output, diode 62 is backbiased and the transistor and lamp are turned off.

While the invention has been described in its preferred embodiments, it is to be understood that the words which have been used are words of description rather than limitation and that changes may be made within the purview of the appended claims without departing from the true scope and spirit of the invention.

We claim:

1. A coherent optical processor fingerprint identification apparatus comprising input means for supporting a finger or fingerprint recording thereof which is to be identified, light source means for directing a coherent light beam onto said input means whereupon incidence of said beam on said finger or fingerprint recording causes a fingerprint data beam to be produced, Fourier transform spatial filter means including positive and negative transparency sections having a fingerprint representative pattern characterized by at least one information band disposed about a central region, focusing means disposed intermediate said input means and said filter means for converging the fingerprint data beam on to said filter means, and detector means positioned to receive light energy of the fingerprint data beam transmitted through said information band, said detector means including a first detector disposed to receive fingerprint data beam energy transmitted through the information band of the positive transparency section and a second detector disposed to receive fingerprint data beam energy transmitted through the information band of the negative transparency section.

2. The apparatus of claim 1 including means for obtaining a signal proportional to the difference between the output signals of said first and second detectors and indicating identification of an input finger or fingerprint recording when said difference signal exceeds a predetermined level.

3. The apparatus of claim 1 including means for determining the occurrence of said first and second detector output signals being respectively greater and lesser than corresponding discrete threshold levels to signify identification of a finger or fingerprint recording applied to said input means.

4. The apparatus of claim 1 wherein the spatial filter means is so constructed and arranged that the positive and negative transparency sections form a composite transparency having arcuate positive and negative transparency segments disposed about the central region which is axially aligned with the optical axis of the processor apparatus.

5. The apparatus of claim 4 including means for obtaining a signal proportional to the difference between the output signals of said first and second detectors and indicating identification of an input finger or fingerprint recording when said difference signal exceeds a predetermined level.

6. The apparatus of claim 4 including means for determining the occurrence of said first and second detector output signals being respectively greater and lesser than corresponding discrete threshold levels to signify identification of a finger or fingerprint recording applied to said input means.

7. A coherent optical processor fingerprint identification apparatus comprising input means for supporting a fingerprint to be identified, light source means for directing a coherent light beam onto said input means whereupon incidence of said beam on said fingerprint causes a fingerprint data beam to be produced, holographic Fourier transform spatial filter means having a fingerprint representative pattern characterized by at least one information band disposed about a central region, said pattern including one interference pattern representative of a fingerprint at a given orientation and an other interference pattern representative of the fingerprint at an orientation angularly displaced from said given orientation by about 90°, focusing means disposed intermediate said input means and said filter means for converging the fingerprint data beam onto said filter means, and detector means including a first detector positioned to receive light energy of the fingerprint data beam diffracted by the information band of said one interference pattern and a second detector positioned to receive light energy of the fingerprint data beam diffracted by the information band of said other interference pattern.

* * * * *